US009396595B1

(12) United States Patent
Daniel

(10) Patent No.: US 9,396,595 B1
(45) Date of Patent: Jul. 19, 2016

(54) SYSTEM AND METHOD FOR AUTHORIZING ENTRY INTO A COUNTRY USING AN INFLIGHT IMMIGRATION CARD

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 13/749,538

(22) Filed: Jan. 24, 2013

Related U.S. Application Data

(60) Provisional application No. 61/590,161, filed on Jan. 24, 2012.

(51) Int. Cl.
*G06F 17/00* (2006.01)
*G07C 9/00* (2006.01)

(52) U.S. Cl.
CPC .................................. *G07C 9/00087* (2013.01)

(58) Field of Classification Search
USPC .................. 235/375, 379, 380, 382, 487, 492
See application file for complete search history.

(56) References Cited

U.S. PATENT DOCUMENTS 6,926,203 B1 * 8/2005 Sehr .............................. 235/492
2002/0198731 A1 * 12/2002 Barnes et al. ..................... 705/1
2004/0255081 A1 * 12/2004 Arnouse ............... G06F 19/323 711/115

* cited by examiner

*Primary Examiner* — Michael G Lee
*Assistant Examiner* — Tabitha Chedekel
(74) *Attorney, Agent, or Firm* — Carol N. Green Kaul, Esq.

(57) ABSTRACT

The present invention is directed to a system and method for authorizing entry into a country using an inflight immigration card in conjunction with a remote card reader connected to a computer, wherein the card reader is configured for reading the inflight immigration card for accessing a user interface for processing inflight or at-sea while the traveler is en-route, the traveler's customs information and pre-determining the traveler's authorized entry status prior to the traveler's arrival at the port of entry, such that the holder of the inflight immigration card and his/her luggage are pre-approved and cleared prior to landing.

16 Claims, 8 Drawing Sheets

SYSTEM AND METHOD FOR AUTHORIZING ENTRY INTO A COUNTRY USING AN INFLIGHT IMMIGRATION CARD

PRIORITY CLAIM

This patent application is a continuation in part of, and claims priority to U.S. Provisional Patent Application Ser. No. 61/590,161 titled "An Apparatus, System And Method For Authorizing Entry Into A Country Using An Inflight Immigration Card" filed Jan. 24, 2012. The entire disclosure of the afore-mentioned application is incorporated by reference as if fully stated herein.

FIELD OF THE INVENTION

The present invention is directed to a system and method for authorizing entry into a country using an inflight immigration card in conjunction with a remote card reader connected to a computer, wherein the card reader is configured for reading the inflight immigration card for accessing a user interface for processing inflight or at-sea while the traveler is en-route, the traveler's customs information and pre-determining the traveler's authorized entry status prior to the traveler's arrival at the port of entry, such that the holder of the inflight immigration card and his/her luggage are pre-approved and cleared prior to landing.

BACKGROUND OF THE INVENTION

Many visitors to a foreign country are honorable citizens of their countries travelling on legitimate business and/or vacation, otherwise they would not have received a foreign visa in the first instance. However, the process of authenticating authorized entry for visitors and nationals alike generally requires responding to several questions on a Customs and Declaration form or the equivalent. The information collected often confirms passport information already on file with the issuing passport office. Nonetheless, travelers are required to supply the information prior to entry using either forms or other access cards, e.g. United States ("U.S.") Global Entry cards, which can be a tedious and time consuming process and is a frequent cause for delays and missed connecting flights.

Although the U.S. Global Entry card expedites customs processing, it does not eliminate the waiting period for clearing the individual's baggage. Additionally, the U.S. Global Entry card is not equally accessible to the general public as it requires processing fees, and is usually cost effective for only a limited group of travelers, e.g. frequent flyers, first class or business passengers. Thus, there is a need for a standardized universal system and method of expediently processing travelers that is effective, affordable and available to the public at large. This invention satisfies these long felt needs and solves the limitations of the prior art in a new and novel manner.

Accordingly, the various embodiments and disclosures described herein satisfies these long felt needs and solves the limitations of the prior art in a new and novel manner.

SUMMARY OF THE INVENTION

A primary objective of the invention is to provide an inflight immigration card that may be used to provide customs information, while inflight to a country's port of entry facilitating ease of processing for authorized entry within a country's borders, whereby the traveler's customs information will be transmitted to the country's port of entry while the traveler is en-route within a predetermined period of time prior to landing, e.g. 2 hours.

Another objective of the invention is to provide a standardized universally accessible apparatus, system and method for international travelers, to clear customs while inflight as the passport and/or visa information may already be on file and can be accessed for processing in an expedient manner without redundant information being unnecessarily exchanged.

Still yet another objective of the invention is to enable traveling patterns to be assessed for red flags while travelers are still inflight, e.g. for frequent fliers who deviate from prior patterns, e.g. declaration of bags for a similar stay of the same duration differ from prior visits, this information could trigger an alert for further checks and controls to be conducted upon landing.

Another objective of the invention is to enable travelers to complete their customs forms online using an inflight mini tablet remote control keyboard and screen, where once completed within the country's prescribed timeframe, the information is transmitted while inflight in real time using Wi-Fi any other connection means. This allows realtime update of the country's custom's information with traveler's declaration of goods, travel documents and other information in readiness for clearance upon the traveler's arrival.

The present invention overcomes the limitations of the prior art by an apparatus, system and method comprising of: an electronic data card configured for electronically storing thereon a traveler's biometric identifier; biometric verification means positioned on the electronic data card, where the biometric verification means is configured for validating the traveler's biometric sample by comparing the biometric sample with the biometric identifier stored on the electronic data card or with a customs server; and a remote card reader connected to a computer, wherein the card reader is configured for reading the electronic data card for accessing a user interface for processing inflight or at-sea while the traveler is en-route, the traveler's customs information and pre-determining the traveler's authorized entry status prior to the traveler's arrival at the port of entry. The computer as referenced herein further comprises of: at least one computer processor; and computer executable instructions executable by at least one computer processor and configured to perform any one or more of the following: control the card reader to read the electronic data card; receive the biometric sample used to verify the identity of the traveler; compare the biometric sample with the biometric identifier previously stored for the traveler; activate the electronic data card's processor to validate the biometric sample with the biometric identifier stored thereon; receive traveler's customs information in part or wholly from the electronic data card via a user interface for propagation of electronic customs forms; execute a user interface to receive manual input of traveler's customs information from traveler.

The electronic data card is configured for being accessed by the user interface executable on the computer which authenticates the traveler's identity and establish the traveler's pre-determined status for entering the country's borders prior to the traveler's arrival will be cleared or flagged for further clearance review. The electronic data card is configured for communicating with the computer or card reader in any of the following manner: wirelessly or wired and may be selected from the group of electronic devices comprising essentially of smart cards. In some embodiments, the user interface may require the administration of an oath or electronic verification that the information provided is true. For instance, the traveler may be required to swipe the inflight immigration cars a second time, whereby the traveler must authenticate his or her identity with an electronic signature by placing his/her designated finger on a biometric verification scanner, which may be electronically displayed on the screen or otherwise positioned on a display monitor or keyboard. Once the appropriate form(s) is/are completed, the form is submitted through inflight message system, using WiFi or 802.11 or any other wireless communication means.

Some airplanes already have an inflight entertainment system complete with a card reader, keyboard and display monitor for streaming selected and/or paid for media content. In some embodiments, the invention utilizes the airplane's existing inflight entertainment system to effectuate the system and methods disclosed herein, employing a user interface to allow access to the customs and border information stored either locally or remotely on land. Once the traveler swipes the inflight immigration card ("IFIC"), the card reader reads the information and provides access to the appropriate customs and border form, e.g. Declaration Form, which may be displayed on the display monitor. The traveler may now update his or her information online while inflight which allows the country's customs to pre-determine prior to the traveler's arrival whether the traveler and his/her luggage should be cleared or flagged prior to the traveler's arrival in the country.

In some embodiments, the customs information is automatically propagated to customs forms as retrieved from the electronic data card as the electronic data card includes memory means wherein any one or more of the following is stored thereon: a biometric sample, biometric identifier, or data structures. Data structures include but are not limited to: card number, security parameters, customs information, card validation information, and global positioning system location information. Customs information as used herein includes but is not limited to: passport information, declaration of goods, declaration of foreign countries visited, purpose for visit to foreign countries, and purpose for visit to country. Passport information includes but is not limited to: photograph, issuing country, passport number, surname, given names, address, nationality, date of birth, place of birth, gender, race, height, color of eyes, passport number, date of issue, passport expiration date, occupation, place of issue, authority, contact information, current visa information, type of visa or endorsement.

An exemplary method comprises of receiving a biometric sample for verifying a traveler's identity; validating the biometric sample with the biometric identifier previously stored for the traveler; accessing a user interface executable by a computer for processing inflight or at-sea while the traveler is en-route, the traveler's customs information; receiving traveler's customs information from any one of the following: in part or wholly from the electronic data card or manual input; transmitting traveler's custom information to the country's customs computer while traveler is still en-route and inflight; determining traveler's status for cleared entry prior to the traveler's arrival at the port of entry and flagging a traveler for further customs review if necessary.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the system and method may be derived by referring to the detailed description and claims when considered in connection with the Figures, wherein like reference numbers refer to similar items throughout the Figures.

DETAILED DESCRIPTION OF THE PREFERRED EMBODIMENT

System Level Overview

Figure 1A:
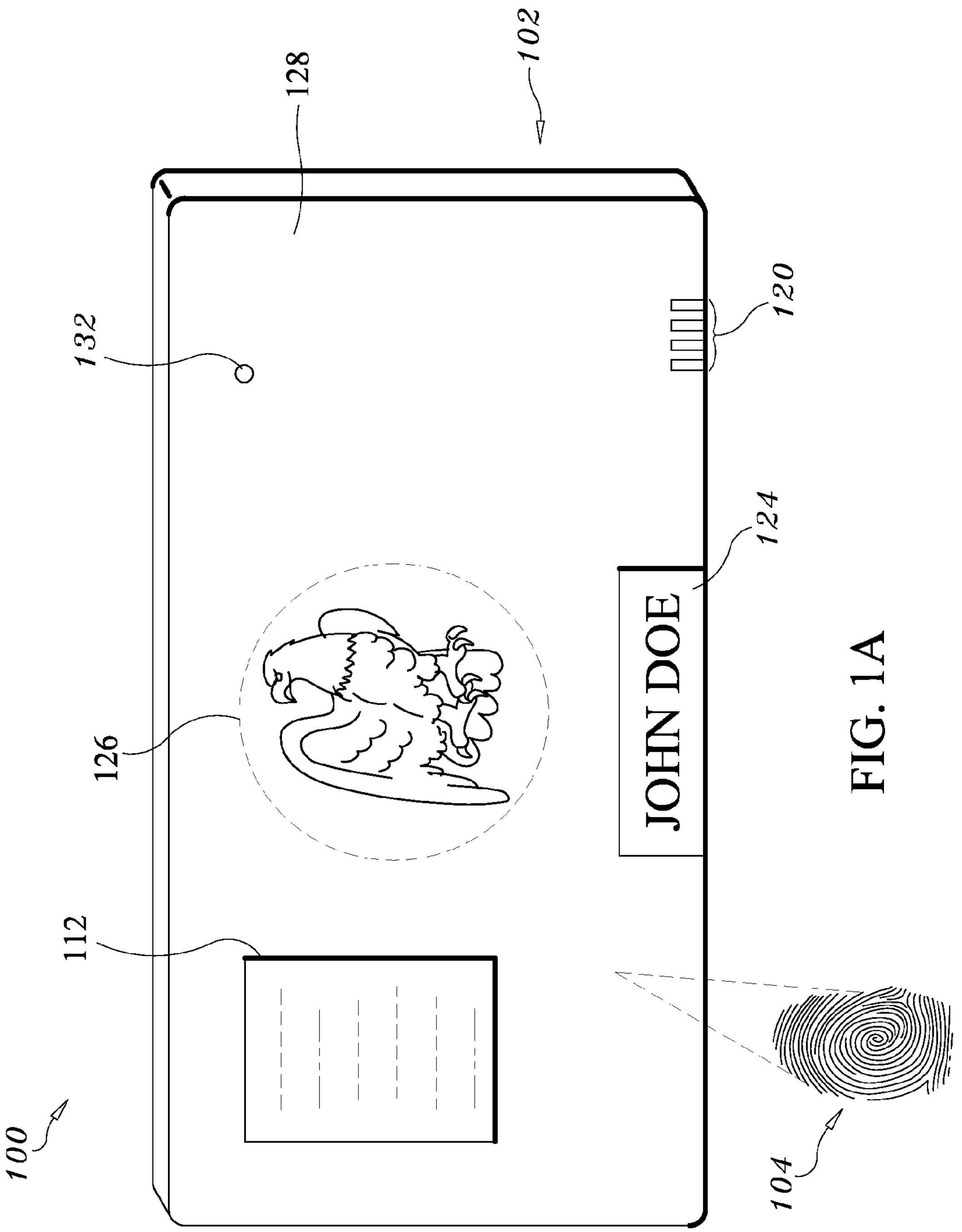
FIG. 1A is an exemplary embodiment of the system's inflight immigration card according to one embodiment.

The following discussion describes in detail, varied embodiments of the system and methods disclosed herein. However, this discussion should not be construed, as limiting the invention to those particular embodiments, as practitioners skilled in the art will appreciate that the system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the various views.

Figure 1B:
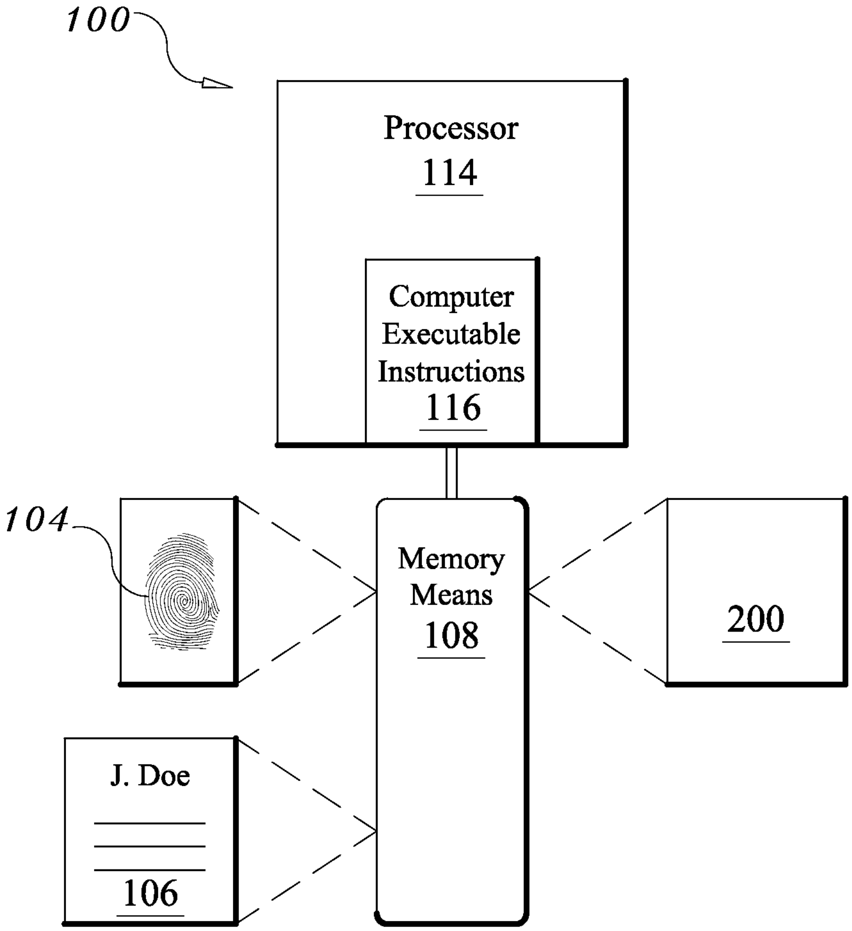
FIG. 1B is an exemplary embodiment of the system's inflight immigration card according to one embodiment.
Figure 1C:
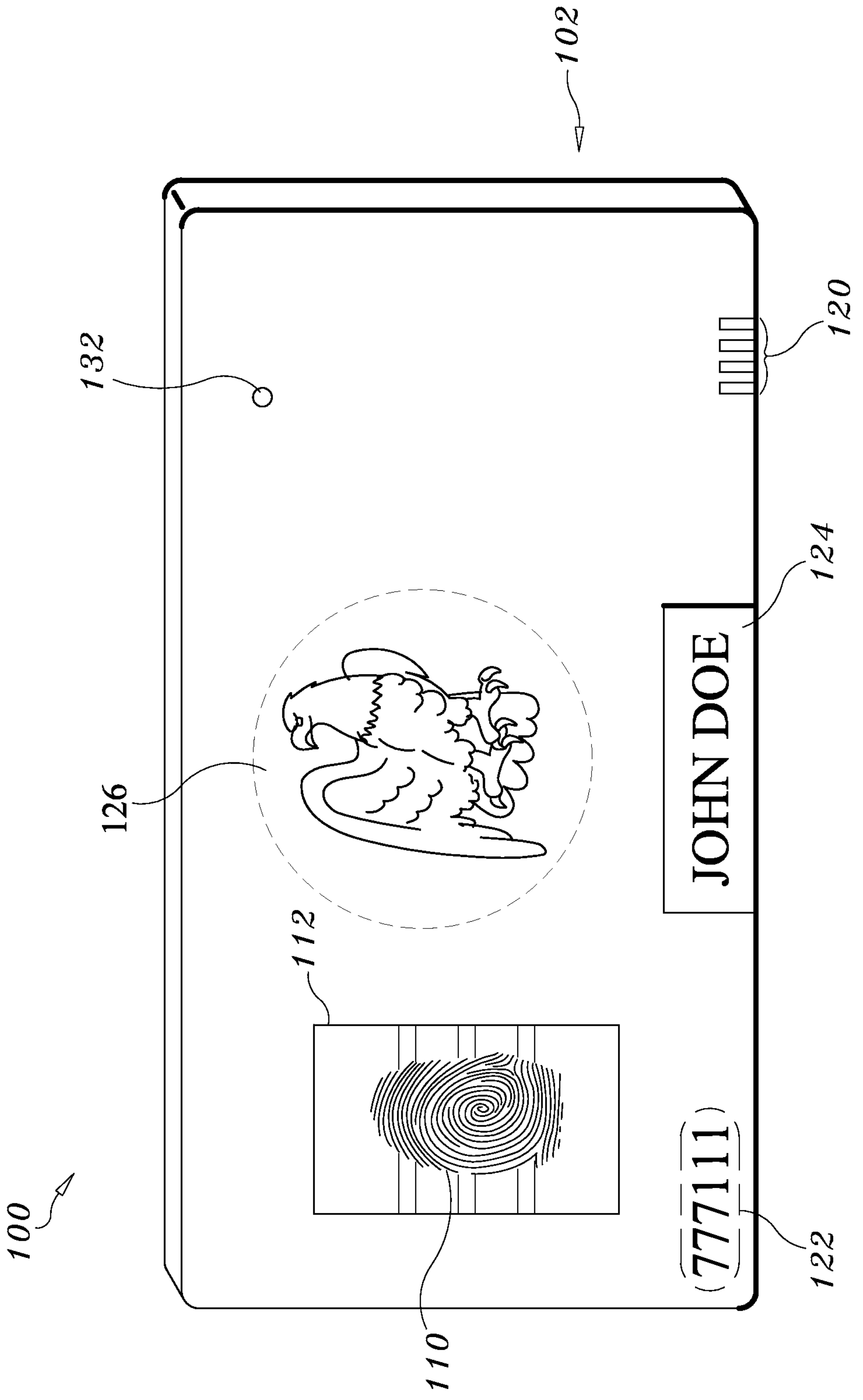
FIG. 1C is an exemplary embodiment of the system's inflight immigration card according to one embodiment.

FIGS. 1A, 1B & 1C are exemplary embodiments of system's 100 inflight immigration card 102 according to one embodiment of the invention. Inflight immigration card 102, a functional component of the system 100, is an electronic data card 102 (hereinafter "electronic data card 102") configured for electronically storing thereon any one or more of the following a traveler's biometric identifier 104, and/or passport information 106. Electronic data card 102 is selected from the group of electronic devices consisting essentially of programmable smart cards, memory cards, and processor cards, with at least one or more memory means 108, 108' embedded therein configured for storing any one or more of the following: a biometric identifier 104 and/or the traveler's passport information 106. Passport information 106 as used herein includes any one or more of the following: photograph, issuing country, passport number, surname, given names, address, nationality, date of birth, place of birth, gender, race, height, color of eyes, passport number, date of issue, passport expiration date, occupation, place of issue, authority or endorsement, contact information, current visa information (if applicable), and type of visa and the like.

Prior to the electronic data card 102 being issued to a traveler, a biometric sample 110 is obtained from the traveler and enrolled as a biometric identifier 104, which may be stored on the electronic data card 102 or with a country's customs office for future reference and comparison. Biometric identifier 104 as used herein describes a biometric sample 110 that uniquely identifies the individual based on his/her intrinsic physical traits, e.g. fingerprints, retina scan, palm geometry, hand geometry, speech, and or other biometric identifiers 104, 104' that are used in the arts. In this manner, the electronic data card 102 is rendered useless if stolen as it cannot be used to identify anyone other than the individual traveler to whom the card 102 was issued. Traveler's identity may be further verified if needed, e.g. in the presence of customs authorities, where traveler may be required to submit a biometric sample 110 using the biometric verification means 112 positioned thereon. Here too, the biometric sample 110 will be compared to the biometric identifier 104 either stored on the electronic data card 102 and/or with the custom's records.

Electronic data card 102 also includes biometric verification means 112 positioned on the electronic data card 102, configured for validating a traveler's biometric sample 110 by comparing the biometric sample 110 with the biometric identifier 104. Biometric verification means 112 includes but is not limited to: fingerprint recognition means, hand geometry recognition means, palm geometry recognition means, iris recognition means, retina recognition means, speech recognition means and any other biometric verification means 112 that are known and used in the arts. Biometric verification means 112 may include at least one computer processor 114 positioned within the electronic data card 102 and disposed in communication with, for example, a fingerprint scanner, hand geometry scanner, a palm geometry scanner, iris scanner, retina scanner, or a traveler interface which includes an audio receiving circuit capable of receiving audio signals at predetermined frequencies and/or with additional hardware complete with electronic circuitry and such other biometric verification means 112 that are known and used in the arts. Illustratively, as seen in FIG. 1A, the biometric verification means 112 includes a fingerprint scanner, where the electronic data card's processor 114 controls the functionality of the fingerprint scanner, generating the varied algorithms for storage of the first valid biometric sample 110 as a biometric identifier 104 and validates the images of subsequent biometric samples 110, 110' received from the traveler.

In some embodiments, the electronic data card 102 may not include a processor 114, while in other embodiments the electronic data card 102 includes at least one processor 114 positioned within. Processor 114 may be any type of processor 114, such as, but not limited to, a central processing unit (CPU), a microprocessor, a video processor, a front end processor, a coprocessor, a single-core processor, a multi-core processor, as well as any known processor 114 that's used in the arts.

As shown in FIG. 1B, in some embodiments, embedded within the processor 114 are computer executable instructions 116 readable by the electronic data card's at least one processor 114 where the computer executable instructions 116 are operative to perform the varied system functions of the electronic data card 102. Computer executable instructions 116 may be any type of computer executable instructions 116, which may be in the form of a computer program, the program being composed in any suitable programming language or source code, such as C++, C, JAVA, JavaScript, HTML, XML, and other programming languages. The at least one processor 114 positioned within the electronic data card 102 is configured for performing any one or more of the following: validating a biometric sample 110 with a biometric identifier 104 stored on the electronic data card's at least one memory means 108; and communicating with a computer via a user interface to transmit traveler's information, e.g. passport information 106 for pre-determining the traveler's authorized entry status prior to the traveler's arrival at the port of entry, such that the holder of the inflight immigration card 102 and his/her luggage are pre-approved and cleared prior to landing.

Figure 2:
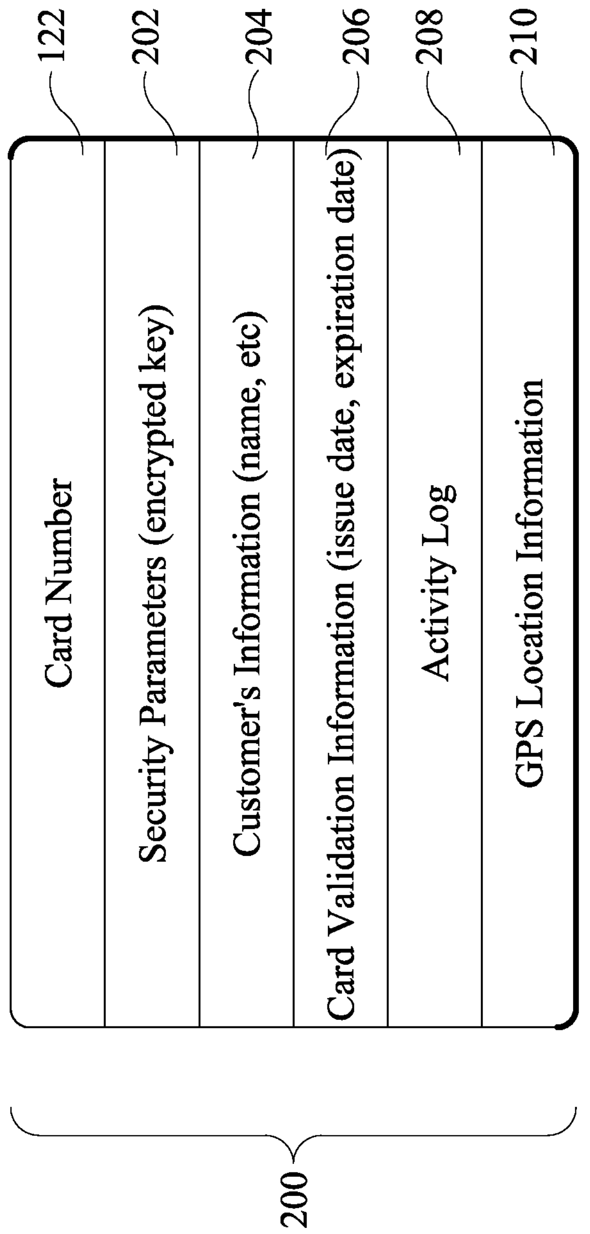
FIG. 2 illustrates, by way of example, collectively the data structures stored within an embodiment of the electronic data card.

In some embodiments, the electronic data card includes at least one memory means 108 as exemplified in FIG. 1B. Such memory means 108 may include a hardware component, e.g. storage hardware, in electrical communication with at least one processor 114. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 108 may comprise of both hardware and software components. Memory means 108 may include any one or more of the following stored thereon: a biometric sample 110, biometric identifier 104, passport information 106, and/or data structures 200 (as shown in FIG. 2). In some embodiments, at least one memory means 108 may be embedded within at least one processor 114 where the information stored therein is encrypted for privacy purposes. In other embodiments, the at least one memory means 108 is adapted with electrical contacts for establishing wired and/or wireless connectivity with external devices, e.g. a computer and the memory means 108, via for example a microchip and/or at least one microprocessor 114 where the memory means 108 is embedded within.

In some embodiments, electronic data card 102 may optionally include a battery 118 (not shown), which serves as a power source for the at least one processor 114 positioned therein. In some embodiments, electronic data card 102 is adapted with electrical contacts 120, 120' for establishing wired and/or wireless connectivity to a charger, e.g. a docking station, and as such may not include a battery 118 (not shown). In that event, processor 114 detects when the electronic data card 102 has been disconnected from an external power source and switches electronic data card 102's power source to an internal power source, such as the battery 118 (not shown).

FIG. 1C is an exemplary embodiment of the electronic data card 102 according to one embodiment. In some embodiments, electronic data card 102 may include an electronic data card number 122, which acts as a unique identifier for the electronic data card 102 and/or traveler. Electronic data card number 122 may be assigned via a random number generating program, comprising of numerals, characters, alphanumeric characters or any other unique identifiers that are known and used in the arts. Prior to being issued to the traveler, the electronic data card number 122 may be recorded as another means of identifying the traveler. Electronic data card 102 may also include other indicia of identification, e.g. the traveler's name 124 or a national emblem 126 from an issuing country or the like. In some embodiments, the traveler's address may also be printed on the electronic data card's exterior 128 and/or stored within the electronic data card's memory means 108.

The traveler's identity may also be verified to the appropriate authorities using the biometric verification means 112 stored thereon. For example, in instances where the biometric verification means 112 includes a fingerprint scanner, the traveler may submit a biometric sample 110 using the same finger previously used to obtain the first valid biometric sample 110 stored thereon as the biometric identifier 104. If the biometric sample 110 matches the biometric identifier 104, the electronic data card's at least one processor 114, which is disposed in communication with the fingerprint scanner, may activate a displaying means 130, which may include a Light Emitting Diode ("LED") display to shown for example a green light visible from the electronic card's exterior 128. In some embodiments, where the biometric sample 110 fails to match the biometric identifier 104 stored thereon, the displaying means 130 may be depict a red light.

FIG. 2 illustrates, by way of example, collectively the data structures 200 stored within an embodiment of the electronic data card 102. Data structures 200 are retained within the electronic data card's memory means 108, which preferably provides sufficient processing resources to facilitate communication and maintain adequate security for the card 102. Data structures 200 may include but is not limited to: card number 122, security parameters 202, customs information 204, card validation information 206, activity log 208, and Global Positioning System ("GPS") location information 210. Card number 122 may act as a unique identifier allowing the system to uniquely recognize and register each electronic data card 102 that has been assigned and issued to individual travelers. Security parameters 202 may be provided, that may include an encrypted key(s) of military grade, and or security codes, biometric security features, and/or other security mechanisms.

Customs information 204 may include but is not limited to: passport information 106, declaration of goods, declaration of foreign countries visited, purpose for visit to foreign countries visited within a certain period of time, and purpose for visit and the like. Passport information 106 for the traveler may be stored thereon, which include but is not limited to photograph, issuing country, passport number, surname, given names, address, nationality, date of birth, place of birth, gender, race, height, color of eyes, passport number, date of issue, passport expiration date, occupation, place of issue, authority or endorsement, contact information, current visa information (if applicable), and type of visa and the like. It will be understood that access to the passport information 106 may be provided in a hierarchical form associated with security provisions to protect the information stored on the electronic data card 102.

Card validation information 206 may include for example issue date that corresponds to the date the electronic data card 102 was issued to the traveler, and/or the card's 102 expiration date. Activity log 208 may optionally contain a record of all uses of the electronic data card 102, e.g. countries for which the electronic data card 102 was presented as a means of pre-determining traveler's authorized entry status to different countries.

In some embodiments, the electronic data card 102 may include GPS location determining means 212 (not shown), e.g. a GPS transponder, for determining the location of the electronic data card 102 with means for encoding 214 (not shown) the location into an electronic signal using e.g. a microprocessor 114, which is transmitted to an authorized institution where the transmitted electronic signal is decoded and the location of the electronic data card 102 or use activity may be monitored in real-time. Therefore, the location of the electronic data card 102 and as such the location of the traveler may be determined in real-time via global satellite system, where the information, i.e. the longitude and latitude coordinates, may be stored in the GPS location information 210.

Figure 3:
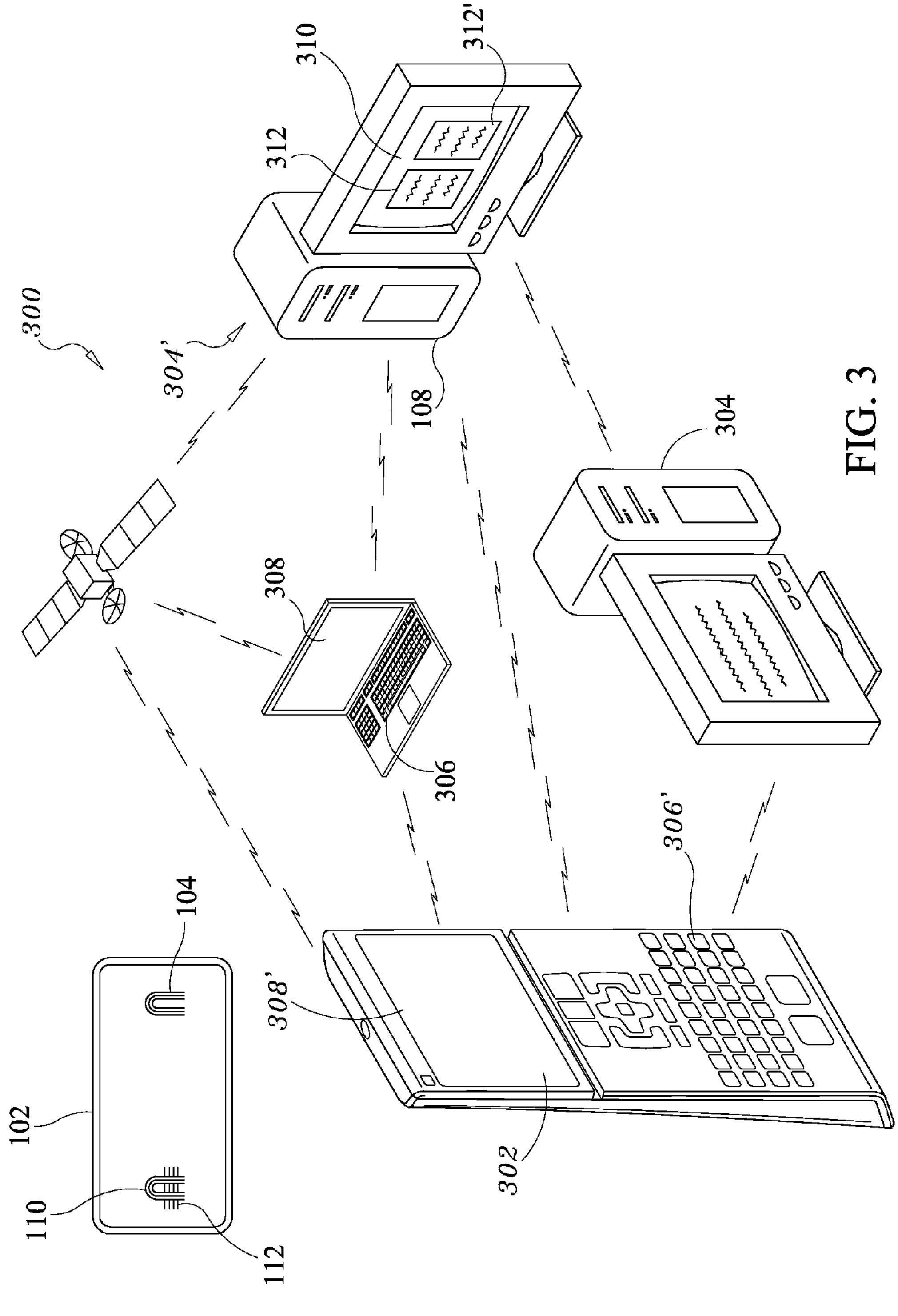
FIG. 3 shows a block diagram representing a system in accordance with one embodiment.

FIG. 3 is an illustrative diagram of an exemplary embodiment of the system 300. System 300 comprises of: an electronic data card 102, configured for electronically storing thereon a traveler's biometric identifier 104; biometric verification means 112 positioned on the electronic data card 102, where the biometric verification means 112 is configured for validating the traveler's biometric sample 110 by comparing the biometric sample 110 with the biometric identifier 104 stored on the electronic data card 102 or with a country's customs office; and a remote card reader 302 connected to a computer 304, wherein the card reader 302 is located in an airplane or at-sea on a ship or boat. Card reader 302 is configured for reading the electronic data card 102 for accessing a user interface 310 for processing inflight or at-sea while the traveler is en-route, the traveler's customs information 204 and pre-determining the traveler's authorized entry status prior to the traveler's arrival at the port of entry.

In some embodiments, the electronic data card 102 is only issued to a pre-approved traveler whose background check has revealed no negative history or there are no other disqualifying factors, e.g. close relative of known terrorist, which would prevent the traveler from being authorized to enter a country's borders. In some embodiments, the traveler's pre-determined status (cleared or flagged) for authorized entry may also be stored on the electronic data card 102.

Traveler's identity may be verified to the system 300 via his/her biometric identifier 104, where the card reader 302 is configured to read the biometric identifier 104 stored on the electronic data card 102 or the traveler may be required to submit an in-person biometric sample 110 via the biometric verification means 112 positioned on the electronic data card 102. In either event, biometric sample 110 is compared with the biometric identifier 104 stored on the electronic data card 102. If the in-person biometric sample 110 matches the biometric identifier 104, the authentication results may be transmitted to the inflight computer 304 or the country's remote computer 304' via the card reader 302, and the computer 304 retrieves traveler's customs information 204 stored on the card's memory means 108.

Card reader 302 is also configured to read all the information stored on the electronic data card 102, e.g. electronic data card number 122, the biometric identifier 104, passport information 106, data structures 200 and the like, which are transmitted to the computer 304. Card reader 302 is configured to read the electronic data card number 122 either wirelessly or wired, and transmits the electronic data card number 122 to the computer 304, where the electronic data card 102 is authenticated as a valid inflight immigration card 102.

Card reader 302 describes a device for scanning and reading the electronic data card 102 and the information stored thereon, e.g. biometric identifier 104, customs information 204, passport information 106, and/or any other information that is a part of the data structures 200 stored thereon. Card reader 302 is connected to a computer 304, and is configured for reading or writing to the electronic data card 102 and in some embodiments for pre-determining the traveler's authorized entry status while inflight or at-sea prior to the traveler's arrival at the port of entry. Card reader 302 is connected to the airplane or ship's computer 304 either wirelessly or wired, wherein card reader 302 is configured for scanning and reading any one or more of the following: the electronic data card number 122, at least one biometric sample 110, biometric identifier 104 stored on the electronic data card 102, the traveler's passport information 106, customs information 204 and/or any other component of the data structures 200 stored thereon. Card reader 302 as exemplified herein may be adapted with electrical contacts 120, 120' for establishing wired and/or wireless connectivity to the electronic data cards 100 and/or the computer 304. Alternatively, a wireless connection may be established, wherein communication access is established in response to proximity or manual activation of the card reader 302. In some embodiments, card reader 302 includes a processor 114' which processes the biometric sample 110 with the biometric identifier 104 for traveler's authorization in the event the electronic data card 102 does not include a processor 114.

Card reader 302 may also be integrated within a computer 304 (e.g. with a slot for wired card connectivity), an external device (e.g. USB connection to a small housing), or be integrated into other devices, e.g. an inflight entertainment system that may include a keyboard 306 and display monitor 308 generally located at the rear of a seat, for streaming selected and/or paid for media content as are known and used in the arts, employing a user interface 310 to allow access to the customs and border information stored either locally or remotely on land. In some embodiments, card reader 302 may also include an electronic keyboard 306' (virtual or physical) and/or an electronic display monitor 308' such that the information read from the electronic data card 102 can be readily viewed on the card reader's monitor 308'. The electronic keyboard 306' and the electronic display monitor 308' are as such are well known and regularly used in the arts.

Once the traveler swipes the electronic data card 102 in the card reader 302, it reads the information stored thereon and provides access to the customs and/or immigration forms 312, 312', e.g. Declaration Form, via the user interface 310, which is displayed on the computer monitor 310. In one embodiment, the contents of the data structures 200 as read by the card reader 302 are automatically propagated into the immigration forms 312, 312' and traveler is then able to manually input any missing or additional information needed to complete the same. In another embodiment, once the traveler's biometric sample 110 has been validated, traveler may manually input his/her information to complete the forms 312, 312'. In either embodiments, traveler's customs information 204 is entered while inflight or at-sea and the traveler's authorization entry status is determined prior to traveler's arrival in the country. In some embodiments, the country may have a preset window, e.g. 1 or 2 hours, more or less, prior to scheduled arrival of the vessel (airplane or ship) for the traveler's customs information 204 to be received. The system 300 and methods disclosed herein include sufficient protocol such that prior to submission a traveler may review his/her manually input customs information 204 to confirm the veracity of the information being submitted.

System 300 may include software components, which comprise of a user interface 310 executable on the computer 304. User interface 310 may be any type of software application, such as a standalone application designed to run on a computer platform, and as such comprises of computer executable instructions 116' readable and executable by the computer's processor 114' and configured for performing any one or more of the following: receiving the biometric sample 110 used to verify the identity of the traveler; comparing the biometric sample 110 with the biometric identifier 104 that may be previously on file and stored for the traveler; receiving traveler's customs information 204 in part or wholly from the electronic data card 102 for propagation of electronic customs forms 312, 312'; or receiving manual input of traveler's customs information 204 directly from traveler; transmitting traveler's custom information 204 to the country's customs computer 304' while traveler is still en-route and inflight such that traveler's predetermined status for authorized entry can be determined; determining traveler's status for cleared entry; or flagging a traveler for further customs review. In some embodiments of the invention, traveler is notified prior to disembarking the vessel whether or not traveler and his/her luggage has been cleared for expedited customs processing.

As such, traveler may proceed to further expedited customs processing, e.g. U.S Global Entry kiosk that is generally located outside the boarding gate of every international airport, thus confirming that the electronic data card 102 holder has left the country. If however, the electronic data card 102 holder is a flight or security risk for any reason, by swiping the electronic data card 102, the traveler would not be allowed to board the airplane or ship. As such the electronic data card 102 make intelligent updates into the Global Entry or customs database that would help to reduce any further in-flight risks.

In some embodiments, user interface 310 may reside on the air-plane's, ship or boat's computer 304 in local memory means 108' or the user interface 310 maybe downloadable from a remote computer 304 on land, where communications may occur over a network or directly, either wired or wirelessly.

Computer 304, e.g. a network enabled computer 304, i.e. a laptop or personal digital assistant subject to wired/wireless connectivity and is configured with a user interface 310 stored thereon to facilitate communications between the electronic data card 102 and the computer 304 through the card reader 302. User interface 310 may comprise in part of a browser, such as for use on a personal computer 304 or similar browsing device.

System 300 may also comprise of computer executable instructions 116" executable by the computer's at least one processor 114', and operative to perform the system 300 and methods disclosed herein. Computer executable instructions 116, 116', 116" may be loaded directly on the computer's processors 114, 114', 114" or may be stored in computer's' memory means 108', such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 116' may be any type of computer executable instructions 116', which may be in the form of a computer program, the program being composed in any suitable programming language or source code, such as C++, C, JAVA, JavaScript, HTML, XML, and other programming languages. Computer executable instructions 116, 116', 116" are operative to perform any one or more of the following: control the card reader 302 to read the electronic data card 102; receive a biometric sample 110 used to verify the identity of the traveler; compare the biometric sample 110 with the biometric identifier 104 previously stored for the traveler and the like.

Computer's at least one processor 114' may be any type of processor, such as a central processing unit (CPU), a microprocessor, a front end processor, a coprocessor, a single-core processor, a multi-core processor, as well as any known processor 114' that's used in the arts.

As shown in FIG. 3, computer 304 is disposed in communication with memory means 108', i.e. illustratively an electronic database, configured for storing and maintaining information for at least one Electronic data card 102 for at least one Traveler. Memory means 108' may include a hardware component, e.g. storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, memory means 108' may include a software component, such as, but not limited to, an electronic database as illustrated in FIG. 3, file management software, and any other software component as used in the arts. In yet another embodiment, memory means 108 may comprise of both hardware and software components.

Methods

Figure 4:
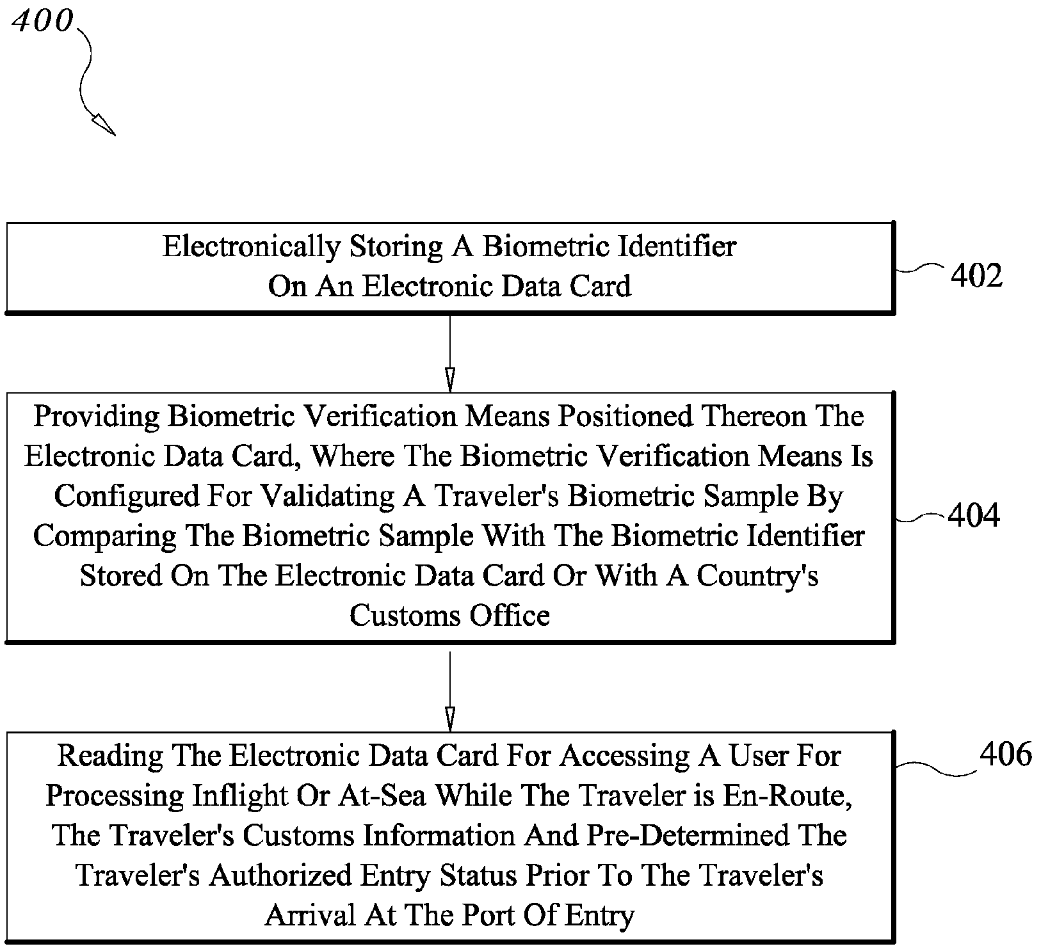
FIG. 4 is a sample flowchart of a block diagram of an exemplary method in accordance with one embodiment.

FIG. 4 is a sample flowchart of an exemplary method 400 according to one embodiment of the invention. Method 400 comprises of electronically storing a biometric identifier 104 on an electronic data card 102 (step 402). Electronic data card 102 as previously mentioned is selected from the group of electronic devices consisting essentially of programmable smart cards, memory cards, and processor cards, with at least one memory means 108 embedded therein configured for storing any one or more of the following for example, the traveler's biometric identifier 104, customs information 204 and or any other data structures 200 stored thereon. Customs information include but is not limited to passport information 106, declaration of goods, declaration of foreign countries visited, purpose for visit to foreign countries visited within a certain period of time, and purpose for visit and the like. Passport information 106 for the traveler may be stored thereon which include but is not limited to photograph, issuing country, passport number, surname, given names, address, nationality, date of birth, place of birth, gender, race, height, color of eyes, passport number, date of issue, passport expiration date, occupation, place of issue, authority or endorsement, contact information, current visa information (if applicable), and type of visa and the like.

Biometric identifier 104 references the valid biometric sample 110 obtained from the traveler that is enrolled on the electronic data card 102 as a valid identifier of the traveler's intrinsic physical traits. Traveler may submit his/her biometric sample 110 via the biometric verification means 112 positioned on the electronic data card.

Method 400 further comprises of providing biometric verification means 112 positioned on the electronic data card 102, where the biometric verification means 112 is configured for validating a traveler's biometric sample 110 by comparing the biometric sample 110 with the biometric identifier 104 stored on the electronic data card 102 or with a foreign customs server (step 404). Biometric verification means 112 includes but is not limited to: fingerprint recognition means, hand geometry recognition means, palm geometry recognition means, iris recognition means, retina recognition means, speech recognition means and any other biometric verification means 112 that are known and used in the arts. Biometric verification means 112 may include at least one computer processor 114 positioned within the electronic data card 102 and disposed in communication with, for example, a fingerprint scanner, hand geometry scanner, a palm geometry scanner, iris scanner, retina scanner, or a traveler interface which includes an audio receiving circuit capable of receiving audio signals at predetermined frequencies and/or with additional hardware complete with electronic circuitry and such other biometric verification means 112 that are known and used in the arts. In an exemplary embodiment, the biometric verification means 112 includes a fingerprint scanner, where the electronic data card's processor 114 controls the functionality of the fingerprint scanner, generating the varied algorithms for storage of the first valid biometric sample 110 as a biometric identifier 104 and validates the images of subsequent biometric samples 110, 110' received from the traveler.

Method 400 further comprises of reading the electronic data card 102 for accessing a user interface 310 for processing inflight or at-sea while the traveler is en-route, the traveler's customs information and pre-determining the traveler's authorized entry status prior to the traveler's arrival at the port of entry (step 406). The electronic data card 102 is configured to be readable by the card reader 302 stored on the electronic data card 102, e.g. electronic data card number 122, the biometric identifier 104, at least one passport information 106, data structures 200 and the like, which are transmitted to the computer 304. Card reader 302 is configured to read the electronic data card number 122 either wirelessly or wired, and transmits the electronic data card number 122 to the computer 304, where the electronic data card 102 is authenticated as a valid inflight immigration card 102. As previously mentioned, card reader 302 describes a device for scanning and reading the electronic data card 102 and the information stored thereon, e.g. biometric identifier 104, customs information 204, passport information 106, and/or any other information that is a part of the data structures 200 stored thereon. Card reader 302 is connected to a computer 304, and is configured for reading or writing to the electronic data card 102 and in some embodiments for pre-determining the traveler's authorized entry status while inflight or at-sea prior to the traveler's arrival at the port of entry.

In an exemplary embodiment, card reader 302 is connected to the airplane or ship's computer 304 either wirelessly or wired, and may be integrated within a computer 304 (e.g. with a slot for wired card connectivity), an external device (e.g. USB connection to a small housing), or be integrated into other devices, e.g. an inflight entertainment system that includes a keyboard 306 and display monitor 308 for streaming selected and/or paid for media content as are known and used in the arts, employing a user interface 310 to allow access to the customs and border information stored either locally or remotely on land. Once the traveler swipes the electronic data card 102 in the card reader 302, it reads the information stored thereon and provides access to the customs and/or immigration forms 312, 312', e.g. Declaration Form, via the user interface 310, which is displayed on the computer monitor 310. In one embodiment, the contents of the data structures 200 as read by the card reader 302 are automatically propagated into the immigration forms 312, 312' and traveler is then able to manually input any missing or additional information needed to complete the same. In another embodiment, once the traveler's biometric sample 110 has been validated, traveler may manually input his/her information to complete the forms 312, 312'. In either embodiments, traveler's customs information 204 is entered while inflight or at-sea and the traveler's authorization entry status is determined prior to traveler's arrival in the country. In some embodiments, the country may have a preset window, e.g. 1 or 2 hours prior to scheduled arrival of the vessel for the traveler's customs information 204 to be received. The system 300 and methods disclosed herein include sufficient protocol such that prior to submission a traveler may review his/her customs information 204 to confirm the veracity of the information being submitted.

Method 400 further comprises of providing a user interface 310 that may be any type of software application, such as a standalone application designed to run on a computer platform, and as such comprises of computer executable instructions 116' readable and executable by the computer's processor 114' and configured for performing any one or more of the following: receiving the biometric sample 110 used to verify the identity of the traveler; comparing the biometric sample 110 with the biometric identifier 104 that may be previously on file and stored for the traveler; receiving traveler's customs information 204 in part or wholly from the electronic data card 102 for propagation of electronic customs forms 312, 312'; or receiving manual input of traveler's customs information 204 directly from traveler; transmitting traveler's custom information 204 to the country's customs computer 304' while traveler is still en-route and inflight such that traveler's predetermined status for authorized entry can be determined; determining traveler's status for cleared entry; or flagging a traveler for further customs review.

Figure 5:
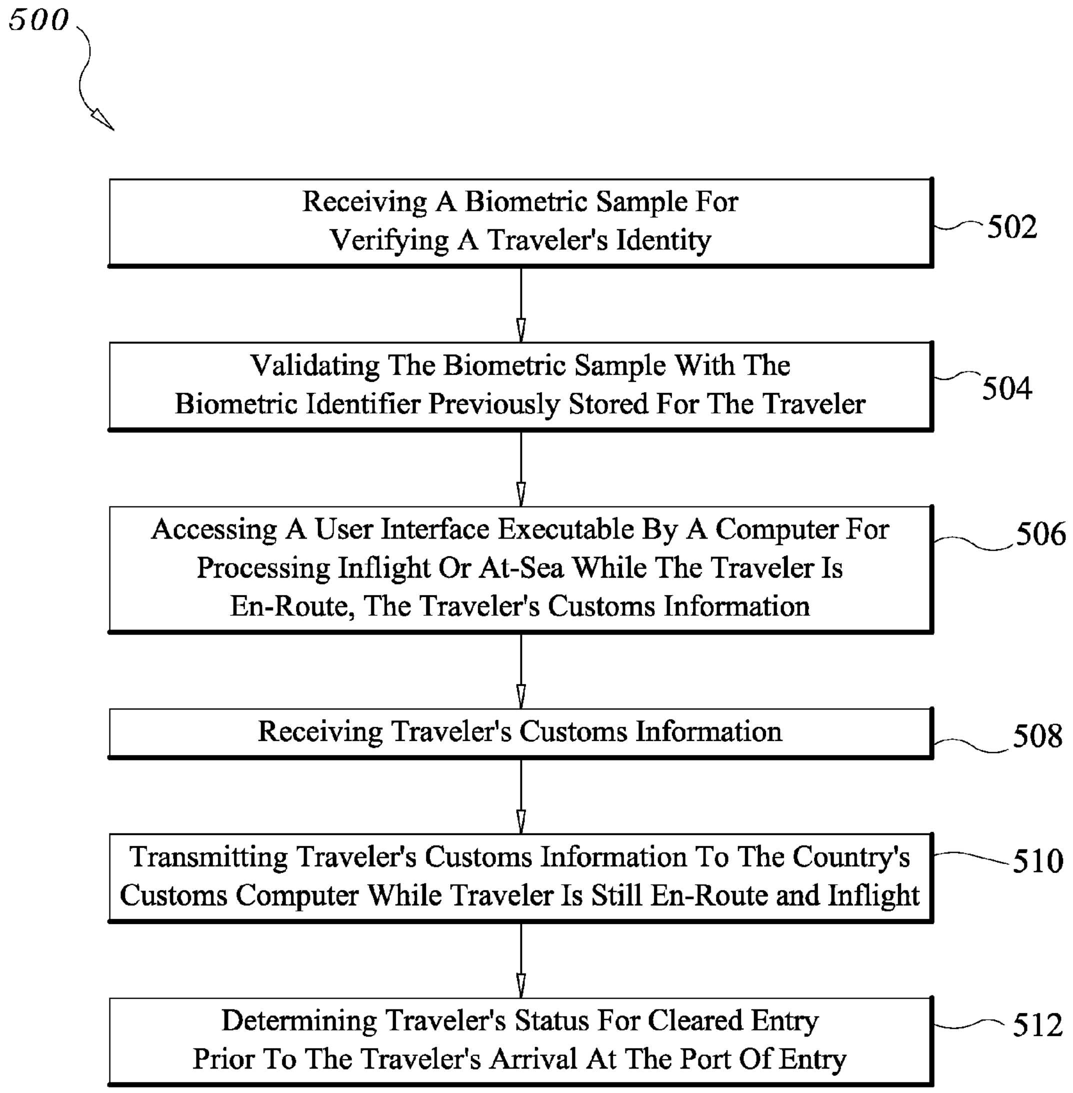
FIG. 5 is a sample flowchart of an exemplary detailed method in accordance with one embodiment

FIG. 5 is a sample flowchart of a block diagram of an exemplary method 500 in accordance with one embodiment. Method 500 comprises of receiving a biometric sample 110 for verifying a traveler's identity (step 502); validating the biometric sample 110 with the biometric identifier 104 previously stored for the traveler (step 504); accessing a user interface 310 executable by a computer 304 for processing inflight or at-sea while the traveler is en-route, the traveler's customs information 204 (step 506).

Method 500 further comprises of receiving traveler's customs information 204 (step 508). Traveler's customs information 204 may be received from any one of the following: in part or wholly from the electronic data card 102 or manual input. Method 500 further comprises of transmitting traveler's custom information 204 to the country's customs computer 304" while traveler is still en-route and inflight (step 510); and determining traveler's status for authorized entry, i.e. cleared or flagged, prior to the traveler's arrival at the port of entry (step 512). If the traveler is cleared he/she may proceed expediently through customs as the processing has already been completed. In some embodiments traveler may also retrieve his or her bag as the luggage may've also been cleared. However, if the customs information 204 contains any discrepancies, user interface 310 may flagging a traveler for further review by the county's customs agents according to their security protocol.

Hardware and Operating Environment

This section provides an overview of exemplary hardware and the operating environments in conjunction with which embodiments of the inventive subject matter can be implemented.

A software program may be launched from a computer readable medium in a computer-based system 300 to execute the functions defined in the software program. Various programming languages may be employed to create software programs designed to implement and perform the methods 400, 500 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as user interface interfaces, or inter-process communication techniques, including remote procedure calls. The teachings of various embodiments are not limited to any particular programming language or environment. Thus, other embodiments may be realized, as discussed regarding FIG. 6 below.

Figure 6:
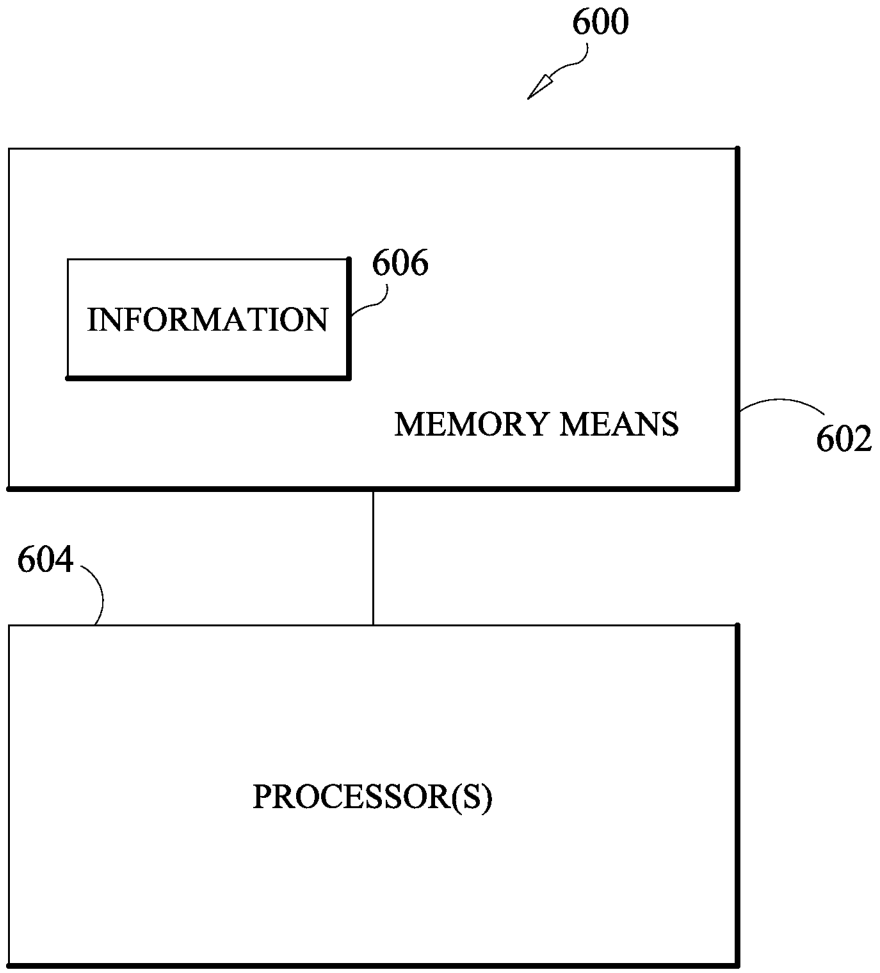
FIG. 6 is a block diagram representing an apparatus according to various embodiments.

FIG. 6 is a block diagram 600 representing an apparatus 600 according to various embodiments. Such embodiments may comprise a computer, a memory means 602, a magnetic or optical disk, some other storage device, or any type of electronic device or system. The apparatus 600 may include one or more processor(s) 604 coupled to a machine-accessible medium such as memory means 602 (e.g., a memory including electrical, optical, or electromagnetic elements). The medium may contain associated information 606 (e.g., computer program instructions, data, or both) which, when accessed, results in a machine (e.g., the processor(s) 604) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. A method comprising:

electronically storing a biometric identifier on an electronic data card; and providing biometric verification means positioned thereon the electronic data card, where the biometric verification means is configured for validating a traveler's biometric sample by comparing the biometric sample with the biometric identifier stored on the electronic data card or with a country's customs office;

reading the electronic data card by a remote card reader configured for establishing wired and wireless connectivity to the electronic data card, wherein if connectivity is wireless, communication access between the electronic data card and a card reader is established in response to spatial proximity, for accessing a user interface for processing inflight or at-sea while the traveler is en-route, receiving the traveler's customs information in part or wholly from the electronic data card and propagating the traveler's customs information on electronic customs forms and providing for selective manual input of traveler's customs information as needed and predetermining the traveler's authorized entry status prior to the traveler's arrival at the port of entry; and providing access to a form database, in communication with the remote card reader, wherein the remote card reader provides access to the form database when the electronic data card is swiped at the remote card reader.

2. The method of claim 1, comprising providing user interface further comprising computer executable instructions executable by at least one computer processor and configured to perform any one or more of the following:

receiving the biometric sample used to verify the identity of the traveler;

comparing the biometric sample with the biometric identifier previously stored for the traveler;

activating the electronic data card's processor to validate the biometric sample with the biometric identifier stored thereon;

transmitting traveler's custom information to the country's customs computer while traveler is still en-route and inflight;

determining traveler's status for cleared entry; and flagging a traveler for further customs review.

3. The method of claim 1, wherein the pre-determined status may include but is not limited to: cleared or flagged.

4. The method of claim 1, wherein the electronic data card is configured for being accessed by the user interface executable on the computer.

5. The method of claim 1, wherein the pre-determined status may include but is not limited to: cleared or flagged.

6. The method of claim 1, wherein the biometric verification means includes but is not limited to: fingerprint recognition means, hand geometry recognition means, palm geometry recognition means, iris recognition means, retina recognition means, speech recognition means.

7. The method of claim 1, wherein the electronic data card is configured for communicating with the computer or card reader in any of the following manner: wirelessly or wired.

8. The method of claim 1, wherein the electronic data card is selected from the group of electronic devices comprising essentially of smart cards.

9. The method of claim 1, wherein the customs information is automatically propagated to customs forms as retrieved from the electronic data card.

10. The method of claim 1, wherein the electronic data card includes memory means wherein any one or more of the following is stored thereon: a biometric sample, biometric identifier, or data structures.

11. The method of claim 10, wherein data structures includes but is not limited to: card number, security parameters, customs information, card validation information, and global positioning system location information.

12. The method of claim 1, wherein customs information includes but is not limited to: passport information, declaration of goods, declaration of foreign countries visited, purpose for visit to foreign countries visited within a certain period of time, and purpose for visit.

13. The method of claim 12, wherein passport information includes but is not limited to: photograph, issuing country, passport number, surname, given names, address, nationality, date of birth, place of birth, gender, race, height, color of eyes, passport number, date of issue, passport expiration date, occupation, place of issue, authority, contact information, current visa information, type of visa or endorsement.

14. A method comprising:

receiving a biometric sample for verifying a traveler's identity;

validating the biometric sample with the biometric identifier previously stored for the traveler;

accessing a user interface executable by a computer for processing inflight or at-sea while the traveler is en-route, the traveler's customs information;

receiving traveler's customs information in part or wholly from the electronic data card as read by a card reader configured for establishing wired and wireless connectivity to the electronic data card, wherein if connectivity is wireless, communication access between the electronic data card and a card reader is established in response to spatial proximity and the card reader and propagating the traveler's customs information on electronic customs forms and providing for manual input of traveler's customs information as needed;

requiring receipt of the traveler's customs information within a preset time window;

transmitting traveler's custom information to the country's customs computer while traveler is still en-route and inflight; and determining traveler's status for cleared entry prior to the traveler's arrival at the port of entry.

15. The method of claim 14 further comprising flagging a traveler for further customs review.

16. The method of claim 14 further comprising receiving traveler's customs information from any one of the following: in part or wholly from the electronic data card or manual input.

* * * * *